United States Patent [19]

Ohashi et al.

[11] Patent Number: 5,306,578
[45] Date of Patent: Apr. 26, 1994

[54] AIR CELL WITH GAS DIFFUSION ELECTRODE

[75] Inventors: Masato Ohashi; Michio Watabe; Hitoshi Takagishi; Masao Ide, all of Takasaki; Keiji Kobayashi, Tokyo, all of Japan

[73] Assignees: Toshiba Battery Co., Ltd.; Toshiba Silicone Co., Ltd., both of Tokyo, Japan

[21] Appl. No.: 967,277

[22] Filed: Oct. 27, 1992

[30] Foreign Application Priority Data

Oct. 30, 1991 [JP] Japan .................. 3-310031

[51] Int. Cl.5 ............................. H01M 8/00
[52] U.S. Cl. ........................ 429/27; 429/86
[58] Field of Search ..................... 429/27, 86

[56] References Cited

U.S. PATENT DOCUMENTS

| | | | |
|---|---|---|---|
| 3,647,542 | 3/1972 | Berger | 429/27 |
| 3,871,920 | 3/1975 | Grebier et al. | 429/27 |
| 3,881,959 | 5/1975 | Tsuchida et al. | 429/27 |
| 4,105,830 | 8/1978 | Kordesch | 429/27 |
| 4,448,856 | 5/1984 | Zuckerbrod et al. | 429/27 |
| 5,145,752 | 9/1992 | Goldstein et al. | 429/27 |
| 5,185,218 | 2/1993 | Brokman et al. | 429/27 |
| 5,190,833 | 3/1993 | Goldstein et al. | 429/27 |

Primary Examiner—Marianne M. Cintins
Assistant Examiner—Michael B. Hydorn
Attorney, Agent, or Firm—Foley & Lardner

[57] ABSTRACT

An air cell comprising a cell container, a gas diffusion electrode which uses oxygen as an active material, and an air-inlet opening for communication with air outside the container. A porous film is provided to support the gas diffusion electrode, and an air-diffusing porous sheet impregnated with film-forming silicone is provided between the porous film and the air-inlet opening.

11 Claims, 1 Drawing Sheet

AIR CELL WITH GAS DIFFUSION ELECTRODE

BACKGROUND OF THE INVENTION

The present invention relates to air cells, and, more particularly, to an air cell having a porous sheet improved so that it shows a satisfactory discharging performance even after a long period of storage.

In batteries which are provided with a gas diffusion electrode and which use oxygen as an active material, there is provided a fuel cell and an air cell; those cells will be hereinafter called "air cells". In an air cell that uses an alkaline solution or neutral solution as electrolyte, particularly, vapor enters and leaves through the gas diffusion electrode (oxygen electrode) in accordance with a change in the internal vapor pressure. This vapor action changes the concentration and volume of the electrolysis solution in the cell, affecting various characteristics of the cell.

The above situation will now be explained referring to a button type air cell shown in FIG. 1. In FIG. 1, reference numeral "1" denotes a gas diffusion electrode which is an oxygen electrode (air electrode), and reference numeral "2" is a porous film which supports the gas diffusion electrode 1, both made of polytetrafluoroethylene that diffuses gas but shuts off a liquid. Reference numeral "3" denotes an air-diffusing porous sheet, reference numeral "4" an air-inlet hole, reference numerals "5" and "6" separators, reference numeral "7" a zinc negative electrode, reference numeral "8" a negative container, reference numeral "9" an insulated gasket, and reference numeral "10" a positive container.

A potassium hydroxide solution with a concentration of 30 to 35% is typically used as the alkali electrolysis solution. If the relative humidity is higher than 47 to 59%, therefore, the electrolysis solution absorbs outside moisture, lowering its concentration and expanding its volume. This reduces the discharging performance and causes the electrolysis solution to leak. If the relative humidity is less than 47%, on the other hand, the electrolysis solution is vaporized, increasing the internal resistance and lowering the discharging performance. As air cells are likely to be significantly affected by the environmental conditions, they do not have an excellent characteristic for long storage and are designed just for a certain field accordingly. The air cells must surmount this problem to achieve a variety of applications.

To overcome those shortcomings, various measures have been taken. For instance, a material that reacts with the electrolysis solution is inserted to the portion of the peripheral portion of the air hole to prevent the electrolysis solution from leaking outside the cell. Alternatively, an electrolysis-solution absorbing member, such as paper, or a nonwoven fabric made of a polymer material, is provided to prevent the electrolysis solution from leaking outside the cell. Further, the air hole is made very small to restrict the amount of the oxygen supply, thereby inhibiting vapor or carbon dioxide gas from permeating the cell. None of those methods can accomplish either a sufficient performance to prevent the leakage of the electrolysis solution or a sufficient discharging performance, particularly, a satisfactory long-discharging performance.

The main causes for such leakage or evaporation of the electrolysis solution are the dilution and volume expansion of the electrolysis solution due to the vapor in the air permeating the cell, and the inhibition of the discharge reaction and blocking of the air passage by the production of a carbonate from the carbon dioxide gas. When the outside humidity is low, flying off of water in the electrolysis solution reduces the aforementioned performances. Proposed solutions to eliminate these problems include a method of supplying air to the oxygen electrode via a film which suppresses the permeation of vapor or carbon dioxide gas to ensure selective permeation of oxygen by priority over it, e.g., via a non-porous uniform thin film of a polysiloxane type material, and a method of using a composite film consisting of a thin film of a polyorganosiloxane copolymer and an alkali resistant, minute-porous film, or a composite film consisting of a thin film of metal oxide or an organic compound containing metal atoms and a proper porous film.

However, those methods cannot yield selective oxygen permeability or sufficiently inhibit the permeation of vapor or carbon dioxide gas, so that air cells showing a satisfactory discharge characteristic have heretofore not been realized.

SUMMARY OF THE INVENTION

It is therefore an object of the present invention to provide an air cell which is free of the above-described problems and which is designed to suppress the permeation of vapor in the air into the cell and vaporization of the electrolysis solution for a long period of time while allowing oxygen in the air to enter the cell at a sufficient speed. Even when the air cell is stored for a long period of time with the interior of the cell kept communicating with the outside, therefore, the air cell can maintain a satisfactory discharge characteristic.

The present inventors found out that inserting an air-diffusing porous sheet impregnated with film-forming silicone between the gas diffusion electrode and the air-inlet hole is very effective to achieve the above object.

The air cell of the present invention comprises a cell container having a gas diffusion electrode, which uses oxygen as an active material, and an air-inlet hole communicating with outside; a porous film for supporting the gas diffusion electrode; and an air-diffusing porous sheet impregnated with film-forming silicone and provided between the porous film and the air-inlet hole.

DESCRIPTION OF THE PREFERRED EMBODIMENT

In the air cell of the present invention, the gas diffusion electrode is formed by mixing active carbon and powder of a water repellent material such as polytetrafluoroethylene, for example, and pressing the acquired mixture.

According to the present invention, the air-diffusing porous sheet and the porous film (2) as porous materials are provided between the air-inlet hole (4) and the gas diffusion electrode (1) so as to support the gas diffusion electrode, thus ensuring air flow to the gas diffusion electrode.

Figure 1:
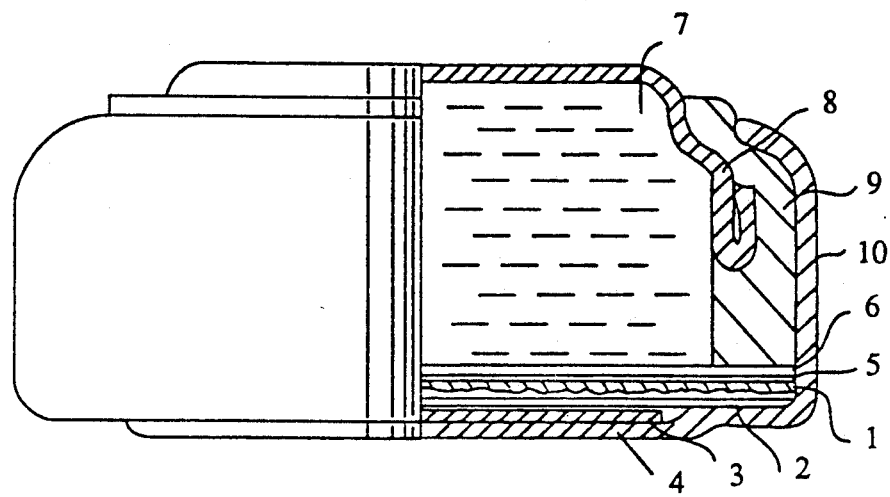
FIG. 1 is a cross-sectional view of a button type zinc-air cell.

The air-diffusing porous sheet is inserted at the position of (3) in FIG. 1, and may be a nonwoven fabric made of polyethylene, polypropylene or nylon or paper such as kraft paper. Of those materials, the kraft paper is preferable due to easier processing.

The feature of the present invention lies in that film-forming silicone is impregnated in the surface of the porous sheet to form a silicone coat. Any silicone can be used as long as it forms a reliable coat on the surface of the porous sheet and shows good water repellency. The following are examples of such silicone; the type described in the following paragraph (1) which forms a rubber coat by crosslinking is particularly preferable.

(1) Silicone composition which is made by adding a crosslinking agent to substantially straight polysiloxane or slightly branched polysiloxane and which forms a reliable rubber coat on the surface of a porous material by forming a network structure through crosslinking by slight heat application in the presence or absence of a catalyst at the room temperature. The average degree of polymerization of the mentioned polysiloxane is preferably 300 or higher, and is more preferably in a range from 3000 to 6000. The crosslinking mechanism may be achieved by introducing a silicon functional group, such as a silanol group, alkoxy group or dialkylketoxime group, at the end of the polysiloxane chain and causing a condensation reaction using as a crosslinking agent a silane compound or siloxane compound having an average of two or more functional groups, preferably three or more functional groups, or may be achieved by using a vinyl group as part of an organic group that is coupled to silicon atoms of the polysiloxane chain and causing a hydrosilylation reaction using a siloxane compound having an Si-H bond as a crosslinking agent.

(2) A silane compound or siloxane compound which has an average of two or more, preferably three or more silicon functional groups, or hydrogen atoms or methoxy groups coupled to silicon in the molecule, e.g., silanol groups, or a mixture of those compounds, and which causes a condensation reaction with slight heat application in the presence or absence of a catalyst at the room temperature to thereby form a reliable coat.

Of the organic group coupled to the silicon atoms of silane, siloxane or the like, a group other than the aforementioned group used in the crosslinking is preferably an alkyl group, such as methyl, ethyl, propyl, butyl, pentyl or hexyl group in order to provide good water repellency to the surface of the porous sheet. The methyl group is particularly preferable. A phenyl group may exist according to the purpose.

In the case involving the condensation reaction to form a coat, examples of the catalyst are a metal organic acid salt, organotin compound, aluminum alkoxide and titaninum alkoxide. If the use of those catalysts is not preferable, the reaction is made without a catalyst. In the case of the hydrosilylation reaction, a platinum compound or the like is used as a catalyst.

In the impregnation of silicone, depending on the type of film-forming silicone, the aforementioned catalyst may be added to that silicone, or the silicone added with no catalyst may be used directly or may be diluted with a proper solvent. The silicone impregnation can be executed by dipping, coating, spraying or any other method. As the solvent, a hydrocarbon type solvent, such as toluene, xylen, n-hexane, n-heptane, methylcyclohexane and petroleum type mixed solvent is preferable. Depending on the purpose or the catalyst to be used, a hydrocarbon halide type solvent, ketone type solvent, ester type solvent or alcohol type solvent may be used together.

The hardening conditions in the impregnation of such film-forming silicone shall be properly selected in accordance with the material and shape of the porous sheet in which the silicone is to be impregnated and the type of the film-forming silicone. Basically, hardening needs to be conducted at a temperature equal to or below the heat resisting limits of the porous sheet and film-forming silicone. After silicone coating, therefore, the resultant structure has only to be left at the room temperature or heated at 200° C. or below; from the productive viewpoint, it is preferable that silicone derived from a hydrosilylation reaction be subjected to a heat treatment at 80° C. or higher. In the case where the porous sheet after the silicone processing is rolled, silicone derived from the hydrosilylation reaction is preferable due to its difficulty of causing the blocking phenomenon.

The silicone coat acquired by the impregnation of such film-forming silicone may have an arbitrary thickness, but its thickness on the outer surface is preferably 0.1 to 20 $\mu$m, with 2 to 10 $\mu$m being particularly preferred silicone coat thinner than 0.1 $\mu$m exhibits poor suppression of vapor permeation and escape, though depending on the type of the silicone. If the silicone coat is significantly thick, particularly, when it is a rubber-like coat, the air flow is likely to be blocked.

According to the present invention, processing the surface of the air-diffusing porous sheet with film-forming silicone allows the diameter of the holes of the porous sheet to be in a range of 50 to 300 $\mu$m, with about 100 $\mu$m being typical.

The porous film used in this invention is made of polytetrafluoroethylene, polyethylene, polypropylene or the like, and polytetrafluoroethylene is preferable.

The other elements of the air cell of the present invention may be of well-known types. Other arbitrary elements may be added without departing from the scope and spirit of the invention.

According to the air cell of the present invention, by subjecting the air-diffusing porous sheet to silicone processing, even if the diameter of the holes are made as wide as 100 $\mu$m, it is possible to prevent water from the outside air from permeating into the gas diffusion electrode. The present invention can therefore increase the amount of air supply to the gas diffusion electrode without causing vapor in the outside air to enter the cell or changing the concentration of the electrolysis solution due to the vaporization of the electrolysis solution.

The air cell of the present invention exhibits excellent liquid leakage prevention and an excellent over-discharge characteristic, and has an excellent discharge characteristic under a heavy load or a light load or an excellent discharge characteristic after a long period of storage with the interior of the cell left communicating with the outside air.

The air cell of the present invention is therefore particularly effective as a battery for electronic devices, such as compact electronic calculators, which discharge non-continuously, and devices, such as watches, which discharge under a relatively light load.

The present invention will now be described in detail by way of comparison between preferable examples and a comparative example.

EXAMPLE 1

(a) Preparation of a Coating Liquid of Film-Forming Silicone 100 parts of polydiorganosiloxane with an average degree of polymerization of 5000, which has both ends blocked by a dimethylvinylsilyl group and consists of 2.0 mol % of a methylvinylsiloxane unit and the balance of a dimethylsiloxane unit, and 3 parts of polymethylhydrogen siloxane (containing 0.16% by weight of hydrogen atoms directly coupled to the silicon atom), which has both ends blocked by a trimethylsilyl group and has a viscosity of 20 cSt at 25° C., were dissolved into 6760 parts of toluene. One part of isopropanol solution of chloroplatinic acid (concentration: 1% by weight of platinum atoms) was added to the resultant solution, yielding a silicone coating liquid.

(b) Preparation of Silicone-Impregnated Air-Diffusing Paper

The silicone coating liquid acquired in (a) above was coated on kraft paper of the size of 50 g/m$^2$, which has minute holes with an average diameter of 100 μm, using the #3 bar coater to impregnate silicone into the paper. The resultant paper was then dried with air and heated for 30 sec at 140° C. to be hardened, yielding air-diffusing paper. The amount of the coat was such that the expected thickness of a thin silicone film formed on the outer surface of the kraft paper becomes 0.1 μm.

(c) Assembly of Air Cell

Figure 2:
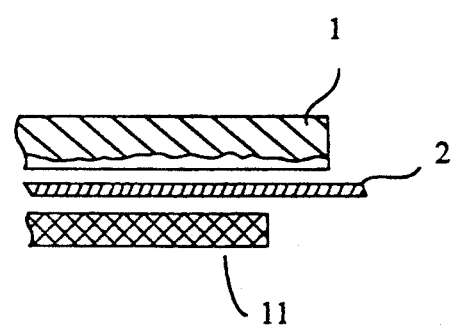
FIG. 2 is an enlarged view of the vicinity of a gas diffusion electrode of a button type zinc-air cell according to the present invention.

The air cell having the same structure as the conventional air cell except for the air-diffusing porous sheet 3 shown in FIG. 1 replaced with the silicone-impregnated air-diffusing paper prepared in (b) above, that is, the air cell having the structure shown in FIG. 1, 11.6 mm in diameter and 5.4 mm in total height, was assembled. FIG. 2 presents an enlarged view of the vicinity of the gas diffusion electrode. Referring to FIG. 2, reference numeral "11" denotes the silicone-impregnated air-diffusing paper. As the porous film 2, a polytetrafluoroethylene porous film having the hole diameter of 0.5 μm and a thickness of 100 μm was used.

(d) Evaluation

The discharge sustaining characteristics of the air cell assembled in the manner described in (c) above immediately after the assembly and after a one-month storage at a temperature of 25° C. and a relative humidity of 65% RH with the air-inlet hole kept communicating with the outside air were evaluated. That is, the discharge sustaining time with the discharge end voltage of 1.0 V was measured under the conditions of a relatively heavy load of 250 Ω, a temperature of 20° C. and a relative humidity of 65% RH.

Further, the liquid leakage during the storage of the air cell and the liquid leakage by the over discharge thereof were evaluated. More specifically, ten cells were used for each evaluation and the evaluation was based on the number of cells that caused a liquid leakage.

Leakage during storage: the air cells were left for 500 hours at 45° C. and at a relative humidity of 93% RH.

Leakage by over discharge: After effecting discharge under a load of 250 Ω, the same load was further applied for 100 hours.

The results of the evaluation are shown in Table 1. Each discharge sustaining time is an average of the values of six cells, while each liquid leakage value is the result of observation of ten cells.

EXAMPLES 2 to 6

The preparation of the silicone-impregnated air-diffusing paper, the assembly of the air cell and the evaluation were conducted in the same manner as done for Example 1 except that the amount of silicone impregnated in the kraft paper in terms of the aforementioned film thickness was varied between 0.5 to 10 μm. The results of the evaluation are given in Table 1.

COMPARATIVE EXAMPLE 1

The assembly of the air cell and the evaluation were conducted in the same manner as done for Example 1 except for the use of kraft paper impregnated with no silicone. The results of the evaluation are given in Table 1. In the discharge test under a heavy load after one-month storage at 20° C. and 65% RH, liquid leakage occurred due to over absorption of water and voltage drop occurred during the discharging by the blocking of the air hole, and the final capacity was merely a capacity corresponding to part of the discharge capacity yielded in the heavy-load test. In contrast, the cells of Examples 1 to 6 exhibited excellent performances and provided capacities almost equal to the initial discharge capacities. Of those examples, Examples 4 to 6 which have a relatively thick silicone layer are excellent. This means that Examples 1 to 6 are demonstrating a sufficient effect of preventing permeation of water or carbon dioxide gas.

EXAMPLE 7

100 parts of polydimethylsiloxane with an average degree of polymerization of 4000, which has both ends blocked by a dimethylhydroxysilyl group, 3 parts of polymethylhydrogen siloxane, which contains 0.16% by weight of hydrogen atoms directly coupled to the silicon atom and a viscosity of 20 cSt at 25° C., and has both ends blocked by a trimethylsilyl group, 6760 parts of toluene, and 2 parts of dibutyltin diacetate were uniformly mixed. Using the mixture as a silicone coating liquid, the preparation of the silicone-impregnated air-diffusing paper, the assembly of the air cell and the evaluation were conducted in the same manner as done for Example 1. The results of the evaluation are given in Table 1.

TABLE 1

| | amount of silicone coating (calculated on the film thickness) (μm) | discharge sustaining time | | liquid leakage | |
|---|---|---|---|---|---|
| | | initial value (h) | after one-month storage (h) | leakage during storage | over-discharge leakage |
| Example 1 | 0.1 | 110 | 85 | 0/10 | 0/10 |
| Example 2 | 0.5 | 111 | 87 | 0/10 | 0/10 |
| Example 3 | 1 | 109 | 87 | 0/10 | 0/10 |
| Example 4 | 3 | 109 | 89 | 0/10 | 0/10 |
| Example 5 | 5 | 110 | 95 | 0/10 | 0/10 |
| Example 6 | 10 | 100 | 94 | 0/10 | 0/10 |
| Example 7 | 5 | 107 | 93 | 0/10 | 0/10 |
| Comparative Example 1 | 0 | 110 | 67 | 2/10 | 5/10 |

We claim:

1. An air cell having first and second electrodes, the air cell comprising:
   a cell container having an air-inlet hole in communication with outside air;
   wherein said first electrode is a gas diffusion electrode, disposed within said cell container, which uses oxygen as an active material;
   a porous film for supporting said gas diffusion electrode; and
   an air-diffusing porous sheet impregnated with film-forming silicone and provided between said porous film and said air-inlet hole.

2. The air cell according to claim 1, wherein said air-diffusing porous sheet has crosslinking polysiloxane on a surface of a porous material.

3. The air cell according to claim 2, wherein said crosslinking polysiloxane has an average degree of polymerization of 300 or above.

4. The air cell according to claim 3, wherein said crosslinking polysiloxane has an average degree of polymerization of 3000 to 6000.

5. The air cell according to claim 1, wherein said air-diffusing porous sheet has a silane compound or siloxane compound having an average of two or more silicon functional groups in a molecule, on a surface of a porous material.

6. The air cell according to claim 1, wherein a silicone film impregnated in the air-diffusing porous sheet has a thickness of 0.1 to 20 μm.

7. The air cell according to claim 6, wherein the silicone film impregnated in the air-diffusing porous sheet has a thickness of 2 to 10 μm.

8. The air cell according to claim 1, wherein said air-diffusing porous sheet has a hole diameter of 50 to 300 μm.

9. The air cell according to claim 1, wherein said porous film is made of at least one of polytetrafluoroethylene, polyethylene, and polypropylene.

10. The air cell according to claim 1, wherein said porous film is made of polytetrafluoroethylene.

11. An air cell having first and second electrodes, comprising:
    a cell container having an air-inlet hole in communication with outside air;
    wherein said first electrode is a gas diffusion electrode, disposed within said cell container, which uses oxygen as an active material;
    a porous film disposed between said gas diffusion electrode and said air-inlet hole for supporting said gas diffusion electrode; and
    an air-diffusion porous sheet impregnated with film-forming silicone and provided between said porous film and said air-inlet hole.

* * * * *